(12) United States Patent
Yamashita et al.

(10) Patent No.: US 6,388,582 B2
(45) Date of Patent: May 14, 2002

(54) LANE GUIDANCE DISPLAY METHOD, AND NAVIGATION DEVICE AND RECORDING MEDIUM FOR REALIZING THE METHOD

(75) Inventors: Atsushi Yamashita, Osaka; Kiyomi Sakamoto, Ikoma; Hiroyuki Hamada, Yawata; Teruaki Ata, Osaka, all of (JP)

(73) Assignee: Sushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/782,040

(22) Filed: Feb. 14, 2001

(30) Foreign Application Priority Data

Feb. 16, 2000 (JP) ........................................ 2000-037873

(51) Int. Cl.⁷ .............................................. G08G 1/123
(52) U.S. Cl. .................. 340/988; 340/995; 340/990; 340/933; 340/901; 701/209; 701/210; 701/208
(58) Field of Search ..................... 340/988, 995, 340/990, 933, 901; 701/209, 210, 208; 364/449, 444, 443, 450

(56) References Cited

U.S. PATENT DOCUMENTS

| 4,992,947 A | * | 2/1991 | Nimura et al. | 364/444 |
| 5,168,452 A | * | 12/1992 | Yamada et al. | 364/444 |
| 5,459,667 A | * | 10/1995 | Odagaki et al. | 364/444 |
| 5,506,779 A | * | 4/1996 | Kanki | 364/449 |
| 5,774,073 A | * | 6/1998 | Maekawa et al. | 340/995 |
| 5,877,708 A | * | 3/1999 | Hijikata | 340/995 |

FOREIGN PATENT DOCUMENTS

JP  2000-18956  1/2000  ........... G01C/21/00

* cited by examiner

Primary Examiner—Brent A. Swarthout
Assistant Examiner—Tai T. Nguyen
(74) Attorney, Agent, or Firm—Wenderoth, Lind & Ponack, L.L.P.

(57) ABSTRACT

Based on searched route information and map data, a target intersection for guidance is specified. For the specified target intersection, lane data regarding the number of lanes and lane control of roads being connected thereto is read, and then recommended lane information which indicates which lane to take when entering the target intersection and to exit therefrom is generated. Based on information about the target intersection and the lane data, a simplified intersection image of the target intersection for lane guidance is generated. Based on the recommended lane information, a running path which passes through the recommended lanes for entering into and exiting from the target intersection is generated, and is combined with the intersection image. Then, lane guidance information for displaying the resultant intersection image is outputted with a predetermined timing. As such, guidance can be visually made on a screen indicating which lanes to take to enter into and exit from the intersection.

21 Claims, 9 Drawing Sheets

F I G. 1
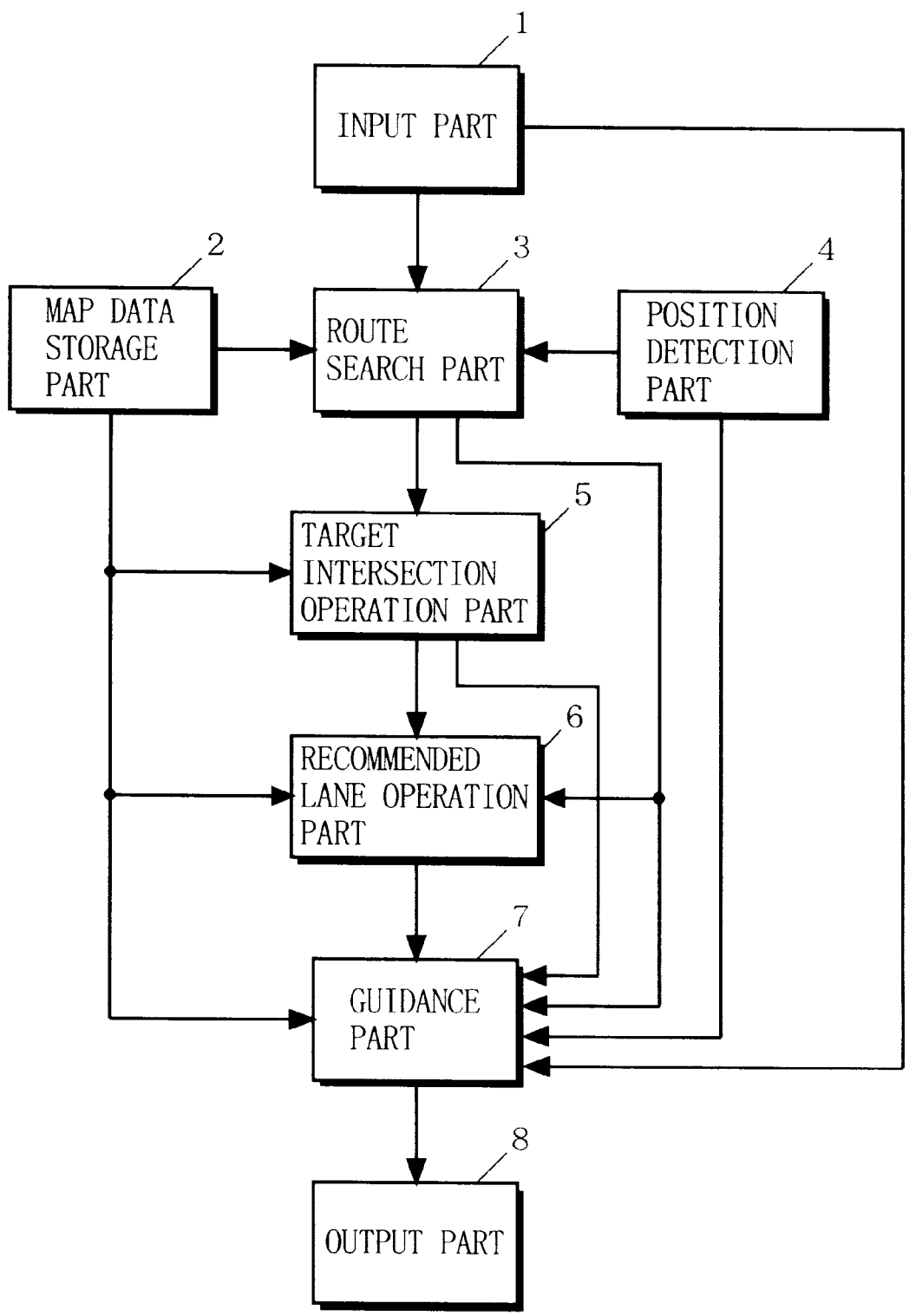

LANE GUIDANCE DISPLAY METHOD, AND NAVIGATION DEVICE AND RECORDING MEDIUM FOR REALIZING THE METHOD

BACKGROUND OF THE INVENTION

1. Field of the Invention

The present invention relates to a lane guidance display method, and a navigation device and a recording medium for realizing the method. More specifically, the lane guidance display method is employed by the navigation device mounted in a vehicle, for example, and used to guide the vehicle, via a display, on which lane to take to enter an intersection or exit therefrom. The recording medium contains a program for executing this method.

2. Description of the Background Art

There have been developed various navigation devices which are of a type mounted in a vehicle, for example, to guide a vehicle from a departure point to a destination or a stopover. Such a conventional navigation device displays a map covering a driving route, optionally with the heading direction indicated by voice when needed. For example, before an intersection where the vehicle is supposed to turn left, the driver hears such a voice state "please take a left turn at the next intersection".

At an intersection on a road with several lanes, the driver may need to follow a lane control when turning right or left, or going straight. If this is the case, such guidance as "take a left turn at the next intersection" is not helpful enough for the driver to decide which lane to take. The driver has to look for traffic signs and road markings, for example, for information relating such lane control. The problem herein is, if the driver is unfamiliar with the road, he/she may often find it difficult to decide which lane to take until the last minute. The reason lies in the fact that such information relating lane control (traffic signs, and the like) is often presented in the very close vicinity of the intersection. Therefore, when the driver is unfamiliar with the road, such conventional route guidance does not provide him/her with much assistance, and consequently results in a sudden lane change or a failure in making the appropriate lane change, preventing the driver from following the searched route.

To get around such problem, the recent type of navigation device has started to guide the vehicle on the lane basis for additional guidance. For example, Japanese Patent Laid-Open Publication No. 2000-18956 discloses such a vehicle-mounted navigation device, providing lane guidance by voice for every intersection on a driving route between a departure point and a destination or a stopover in consideration of a heading direction. For example, when the vehicle is supposed to turn left at the next intersection, the driver hears a voice saying "please move into a far left lane, and keep going" before hearing "please take a left turn at the next intersection".

Here, if the driver is unskilled in driving or unfamiliar with the area, he/she may also want to know on which lane he/she is supposed to be when exiting the intersection. That is, in a case where the vehicle needs to make turns in a row, for example first left and then right, in a short distance on roads with several lanes, the most preferred route is taking a far right lane after turning left.

In such a conventional navigation device as offering the lane guidance only when the vehicle comes in close vicinity of an intersection ahead, if the lane guidance cannot catch up with such successive turns, one mistake of wrongly exiting from a lane at the first intersection will lead to a failure in entering an appropriate lane at the next intersection. This is because the driver is more likely to miss information relating lane control when exiting from the intersection than entering. As a result, as described above, this leads to sudden lane change or a failure in making an appropriate lane change, preventing the driver from, following the searched route.

In the above conventional navigation device, lane guidance is offered by voice as appropriate together with the map of the running route on the display. The issue here is that the driver needs to correctly understand what the voice is saying (for example, distinguish between "left turn" and "right turn", and such lane guidance by a map display and a voice is not understandable at a glance or intuitive. Further, if the driver fails to hear the lane guidance (for example, due to loud music or the driver being on a cellular phone), the lane guidance system does not provide him/her much assistance.

SUMMARY OF THE INVENTION

Therefore, an object of the present invention is to provide a lane guidance display method for displaying a map of running route and guiding a person driving a vehicle on which lane to take at both entering an intersection and exiting therefrom, a navigation device for employing the method, and a recording medium containing a program for executing the method.

The present invention has the following features to attain the above-object.

A first aspect of the present invention is directed to a lane guidance display method for guiding, on a screen, a vehicle on which lane to take to go through an intersection. The method comprises searching for a guidance route from a departure point to a destination or a stopover based on map data including lane data, which includes a number of lanes and a lane control of roads connected to an intersection, and specifying an intersection for guidance (target intersection) located on the guidance route. The method also comprises determining, based on the guidance route and the lane data, a recommended enter lane for entering the target intersection and a recommended exit lane for exiting therefrom, and guiding the vehicle by displaying the recommended enter and exit lanes on the screen.

As described above, in the first aspect, lanes recommended respectively for entering into and exiting from a target intersection on a guidance route are determined, and then guidance is preformed. Accordingly, a vehicle can be guided with such lanes that are helpful for smooth travel, and therefore, lane guidance offered thereby is driver friendly.

Preferably, the guiding operation comprises generating an intersection image of the target intersection for lane guidance based on the lane data, generating a running path for the target intersection which passes through both the recommended enter lane and the recommended exit lane, and displaying, on the screen, a lane guidance intersection image which is a combination of the intersection image and the running path.

As such, the lanes recommended for entering into and exiting from the intersection (recommended lanes) are represented by a running path connecting the recommended lanes on an intersection image (simplified, for example) of the target intersection. Accordingly, guidance can be visually offered on a map covering the running route on a screen. Thus, a driver of the vehicle can understand at a glance how to go through the intersection by knowing which lane to take, and lane guidance is thereby driver friendly.

Also preferably, when a plurality of target intersections are in proximity, the intersection image generated in the intersection image generating operation is a combination of the target intersections in proximity, and the running path generated in the running path generating operation passes through the target intersections in proximity.

As such, by generating and displaying an intersection image which is a combination of several target intersections, even if a vehicle successively makes left and right turns in a short distance and thus, the audio guidance cannot catch up therewith, the driver can figure out at a glance how to go through the intersections based on which lane to take in advance.

Also preferably, specified as the target intersection in the specifying operation are all of the intersections found on the guidance route, and the lane guidance intersection image is displayed plurally and collectively in the displaying step in the order of the target intersections on the guidance route.

As such, the driver can grasp recommended lanes for the entire route in advance with no consideration for the distance between the actual intersections and further directions.

Here, the running path generated in the running path generating operation may be represented by one or more successive arrows directing the vehicle from the recommended enter lane to the recommended exit lane.

In this manner, the lane guidance offered thereby is driver friendly and allows the driver to understand how to go through the intersection by taking the appropriate lane, at a glance.

Further, in the determining step, additionally calculated for each exit lane may be a lane level of recommendation, which is represented by discrete or successive numbers, and the running path generated in the running path generating operation may be represented in various manners, depending on the lane level of recommendation, by one or more successive arrows directed from the recommended enter lane to the recommended exit lane.

In this manner, the running path can be represented by such successive arrows in various manners depending on the lane level of recommendation. This leaves lane selection to the driver discretion by showing him/her the level of recommendation for each exit lane, and in this sense, the lane guidance offered thereby is driver friendly.

Still further, in the determining operation, grounds for the recommended enter and exit lanes may be additionally found, and in the displaying operation, an image based on the grounds may be displayed together with the lane guidance intersection image.

In this manner, together with the running path represented by such successive arrows, the driver can see the grounds for the lane recommendation, therefore can rest assured in addition to the effects achieved in the foregoing.

A second aspect of the present invention is directed to a navigation device for guiding a vehicle on a screen from a departure point to a destination or a stopover. The device comprises a map data storage part for storing map data including lane data, which includes the number of lanes and lane control of roads to be connected to an intersection, a route search part for searching for, based on the map data, a guidance route from the departure point to the destination or the stopover, a vehicle position detection part for detecting a vehicle position on the map data, and a target intersection operation part for searching for and specifying, based on the guidance route and the map data, an intersection requiring guidance on the guidance route (target intersection). The device also comprises a recommended lane operation part for determining, based on the guidance route, the lane data, and the target intersection, a recommended enter lane and a recommended exit lane for the target intersection, a guidance part for generating, based on the recommended enter and exit lanes and the lane data, lane guidance data required for display on the screen, and an output part for displaying guidance on the screen according to the lane guidance data.

Preferably, as the lane guidance data, the guidance part generates an intersection image for lane guidance based on the lane data for the target intersection, generates a running path which passes through the recommended enter lane and the recommended exit lane for the target intersection, and generates a lane guidance intersection image which is a combination of the intersection image and the running path.

Also preferably, when a plurality of target intersections are in, the intersection image generated by the guidance part is a combination of the target intersections in proximity, and the running path generated thereby passes through the target intersections in proximity.

Also preferably, the target intersection operation part specifies all of the intersections found on the guidance route as the target intersections, and the guidance part outputs the lane guidance data to the output part to plurally and collectively display the lane guidance intersection image in order of the target intersections on the guidance route.

Here, the running path generated by the guidance part may be represented by one or more successive arrows directing the vehicle from the recommended enter lane to the recommended exit lane.

Further, additionally calculated by the recommended lane operation part may be a lane level of recommendation for each exit lane represented by discrete or successive numbers, and the running path generated by the guidance part may be represented, in various manners depending on the lane level of recommendation, by one or more successive arrows directed from the recommended enter lane to the recommended exit lane.

Still further, the recommended lane operation part may additionally find grounds for the recommended enter and exit lanes, and the guidance part may output the lane guidance data to the output part to display an image based on the grounds together with the lane guidance intersection image.

As the second aspect, a navigation device is so structured as to execute the lane guidance display method of the above first aspect, thereby performing the effective lane guidance of the present invention.

A third aspect of the present invention is directed to a recording medium on which a lane guidance display method for guiding, on a screen, a vehicle on which lane to take to go through an intersection is recorded as a program executable on a computer. The program at least carries out searching for a guidance route from a departure point to a destination or a stopover based on map data including lane data, including the number of lanes and lane control of roads to be connected to an intersection, specifying an intersection for guidance (hereinafter, refers to as a target intersection) located on the guidance route, determining, based on the guidance route and the lane data, a recommended enter lane for entering into the target intersection and a recommended exit lane for exiting therefrom, and generating an intersection image of the target intersection for lane guidance based on the lane data. The program also carries out generating a running path for the target intersection which passes through both the recommended enter lane and the recommended exit lane, and displaying, on the screen, a lane guidance intersection image which is a combination of the intersection image and the running path.

Here, the running path generated in the running path generating operation may be represented by one or more successive arrows directing from the recommended enter lane to the recommended exit lane.

Further, in the determining operation, additionally calculated for each exit lane may be a lane level of recommendation, which is represented by discrete or successive numbers, and the running path generated in the running path generating operation may be represented, in various manners depending on the lane level of recommendation, by one or more successive arrows directed from the recommended enter lane to the recommended exit lane.

Still further, in the determining operation, grounds for the recommended enter and exit lanes may be additionally found, and in the displaying operation, an image based on the grounds may be displayed together with the lane guidance intersection image.

As is the third aspect, a program carrying out the lane guidance display method of the first aspect is recorded on a medium, whereby the method can be supplied to an existing device in the form of software.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram of the construction of a navigation device employing; a lane guidance display method according to an embodiment of the present invention;

DESCRIPTION OF THE PREFERRED EMBODIMENT

Figure 2:
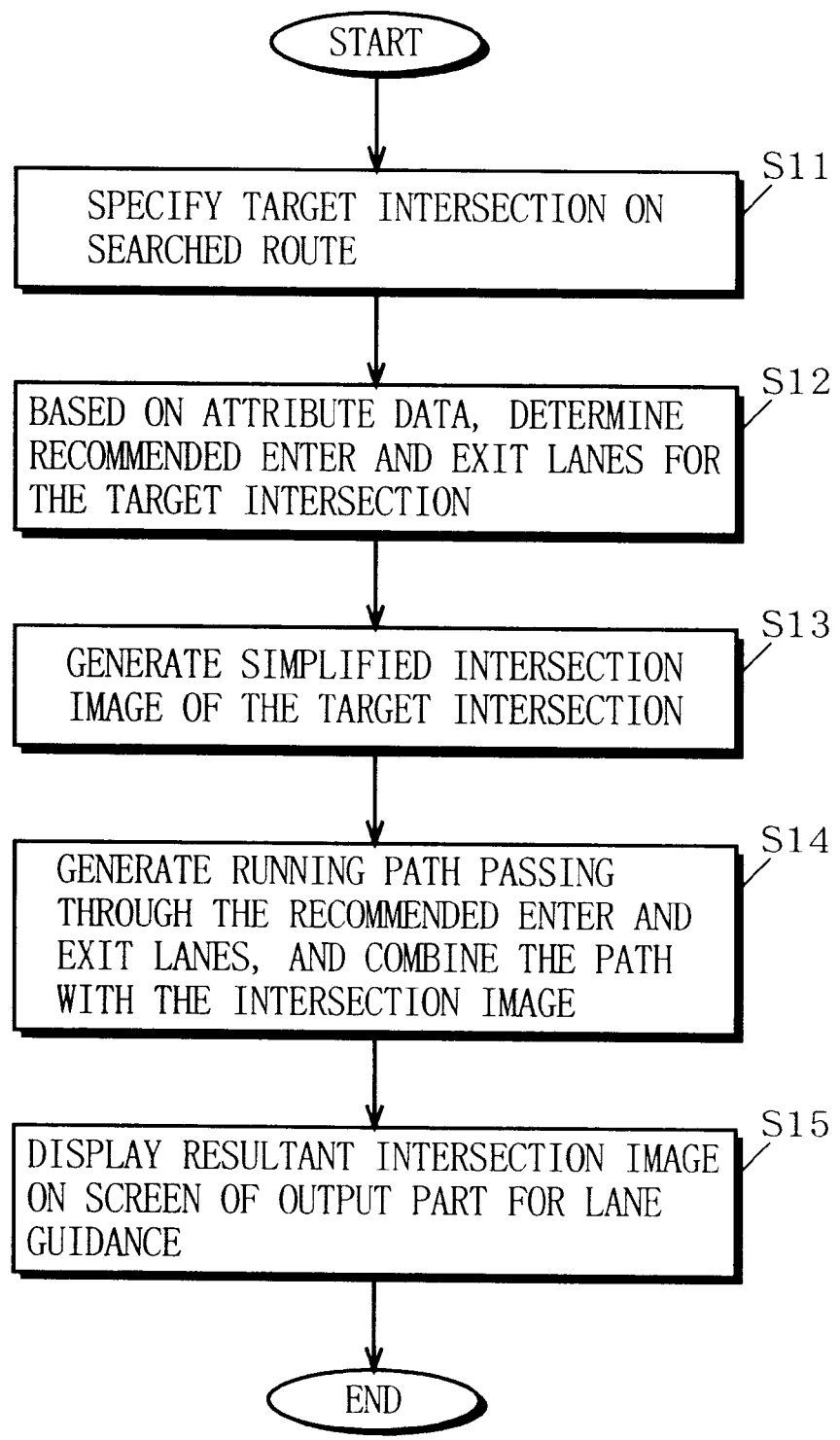
FIG. 2 is a flowchart showing an example of operation of a target intersection operation part, a recommended lane operation part, and a guidance part.

FIG. 1 is a block diagram showing the structure of a navigation device employing a lane guidance display method according to an embodiment of the present invention. In FIG. 1, the navigation device includes an input part 1, a map data storage part: 2, a route search part 3, a position detection part 4, a target intersection operation part 5, a recommended lane operation part 6, a guidance part 7, and an output part 8.

The lane guidance display method of the present invention is basically realized by the target intersection operation part 5, the recommended lane operation part 6, and the guidance part 7. For easy understanding, the entire navigation device employing the lane guidance display method will be first outlined. Note that the constructions of the input part 1, the map data storage part 2, the route search part 3, the position detection part 4, and the output part 8 are not restricted to those exemplified in the following description, and any construction used in known navigation devices may be adopted. Here, the known navigation device is not restricted to a vehicle-mounted type, and may be in the form of navigation software operable on computer devices.

The input part 1 includes a remote controller, a touch sensor, a keyboard, a mouse, and the like, operated by a user, for example, and is used to input instructions such as to select functions of a map display unit (change of the item to be processed, switch the map, change the hierarchical level, and the like), set a departure point and a destination (including a stopover, the same is applicable hereinafter), and to select a route search mode. Instruction information outputted from the input part 1 is supplied to the route search part 3 and the guidance part 7.

The map data storage part 2 includes an optical disk (CD, DVD, and the like), a hard disk, a large-capacity memory, and the like, for storing information relating a road network (map data) such as the connection status, coordinates, shapes, attributes, and information about lane control for respective intersections and roads. The map data is assumed to include information about the number of lanes and lane control of roads connected to the respective intersections. The map data may be two-dimensional map data or three-dimensional map data. The map data stored in the map data storage part 2 is read and used as appropriate by the route research part 3, the target intersection operation part 5, the recommended lane operation part 6, and the guidance part 7.

The position detection part 4 includes a GPS, a radio beacon receiver, a vehicle speed sensor, various speed sensors, an absolute bearing sensor, and the like, for detecting the current position of a vehicle. Information about the vehicle current position provided by the position detection part 4 is supplied to the route search part 3 and the guidance part 7.

The route search part 3 reads map data in a necessary range from the map data storage part 2 according to the instruction information received from the input part 1. The route search part 3 then determines the departure point and the destination based on the received instruction information such as location information, and searches for a minimum-cost route from the departure point to the destination in consideration of intersection traffic control and one-way traffic control if any.

To state a specific example, upon receipt of an instruction of executing the route search mode from the input part 1, the route search part 3 sets, as the departure point of the search, either the departure point inputted into the input part 1 or the vehicle current position detected by the position detection part 4, and sets the destination inputted into the input part 1 as the destination of the search. The route search part 3 also reads map data in a range covering the area from the departure point to the destination from the map data storage part 2. Then, the route search part 3 searches for a guidance route (for example, a shortest-time route or a shortestdistance route) from the departure point to the destination on the read map data. As an algorithm for the route search executed by the route search part 3, the known Dijkstra algorithm, for example, is used.

Upon completion of the route search, the route search part 3 outputs the resultant route information to the target intersection operation part 5, the recommended lane operation part 6, and the guidance part 7.

The target intersection operation part 5 searches and specifies any intersection on the searched route based on the route information received from the route search part 3 and the map data (the same map data as the one read by the route search part 3) received from the map data storage part 2 (hereinafter, thus specified intersection is referred to as target intersection). Here, specified may be every intersection found on the searched route, or only any specific intersection required to be guided through in a predetermined manner. The specific intersection includes ones where roads with several lanes intersect with one another or where the vehicle is supposed to turn right or left. Information about those specified target intersections is outputted to the recommended lane operation part 6 and the guidance part 7.

For each of those target intersections, the recommended lane operation part 6 then determines which lanes to recommend to the driver, respectively, for entering and exiting the intersection, and generates information about the thus determined, recommended lanes. This determination is made based on the map data (the number of lanes, lane control information, and the like) received from the map data storage part 2, the route information from the route search part 3, and the information about those target intersections provided by the target intersection operation part 5. Thus generated recommended lane information is outputted to the guidance part 7.

Upon receipt of an instruction of executing a route guidance mode from the input part 1, the guidance part 7 generates guidance information for directional guidance on a map. This is done based on the route information provided by the route search part 3, the information about the vehicle current position received from the position detection part 4, and the map data received from the map data storage part 2. The guidance part 7 also executes a predetermined operation to be described later, based on the map data, the target intersection information received from the target intersection operation part 5, and the recommended lane information provided by the recommended lane operation part 6, and generates lane guidance information for each of the target intersections. The guidance part 7 then outputs the guidance information and the lane guidance information to the output part 8 with a predetermined timing.

The output part 8 includes a display device (a liquid crystal display, a CRT display, and the like) and displays an image for guidance on a screen based on the guidance information and the lane guidance information received from the guidance part 7.

Hereinafter, with reference to FIGS. 2 to 10, the lane guidance display method of this embodiment will be described in a concrete manner.

Figure 3:
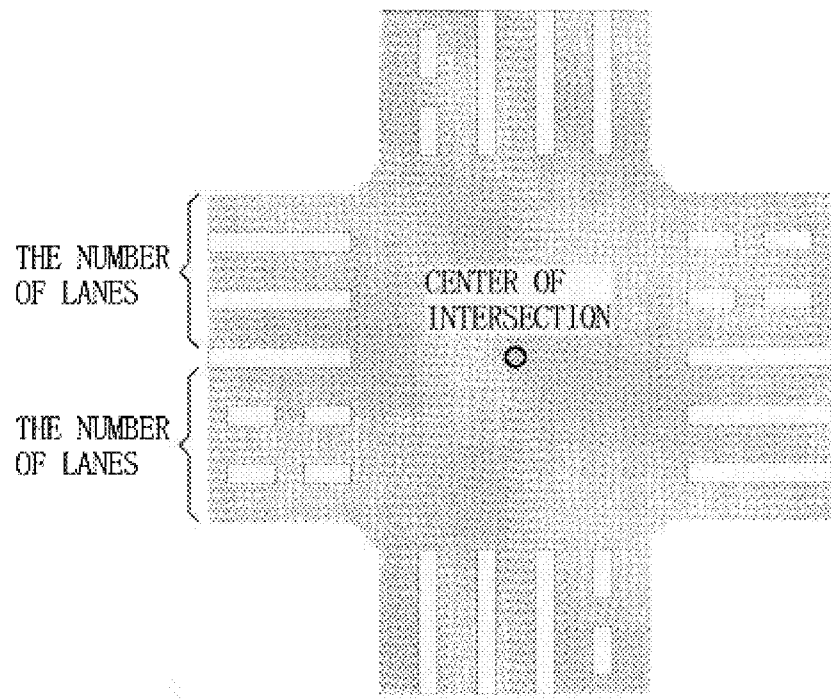
FIG. 3 is an exemplary illustration of an intersection image generated by the guidance part 7.
Figure 4:
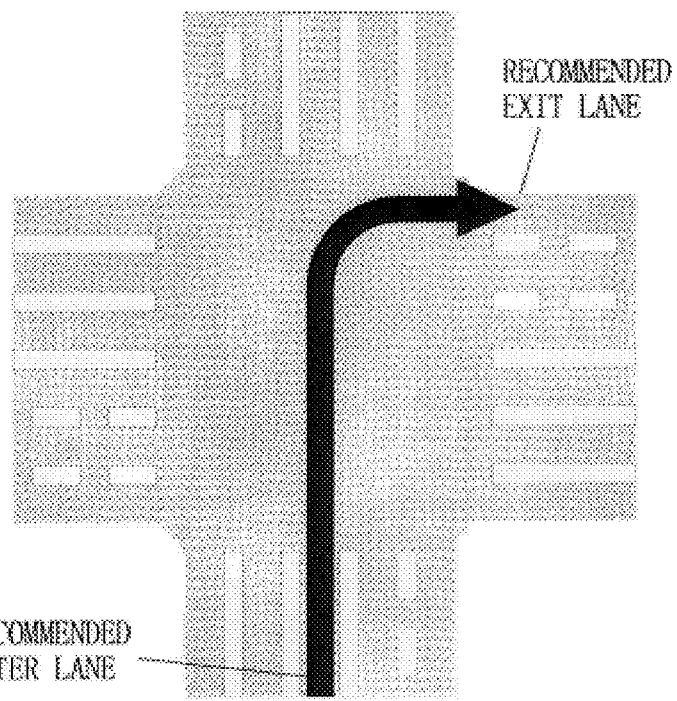
FIG. 4 is an exemplary illustration of an intersection image generated by combining a running path generated under a first technique with the intersection image of FIG. 3.
Figure 7:
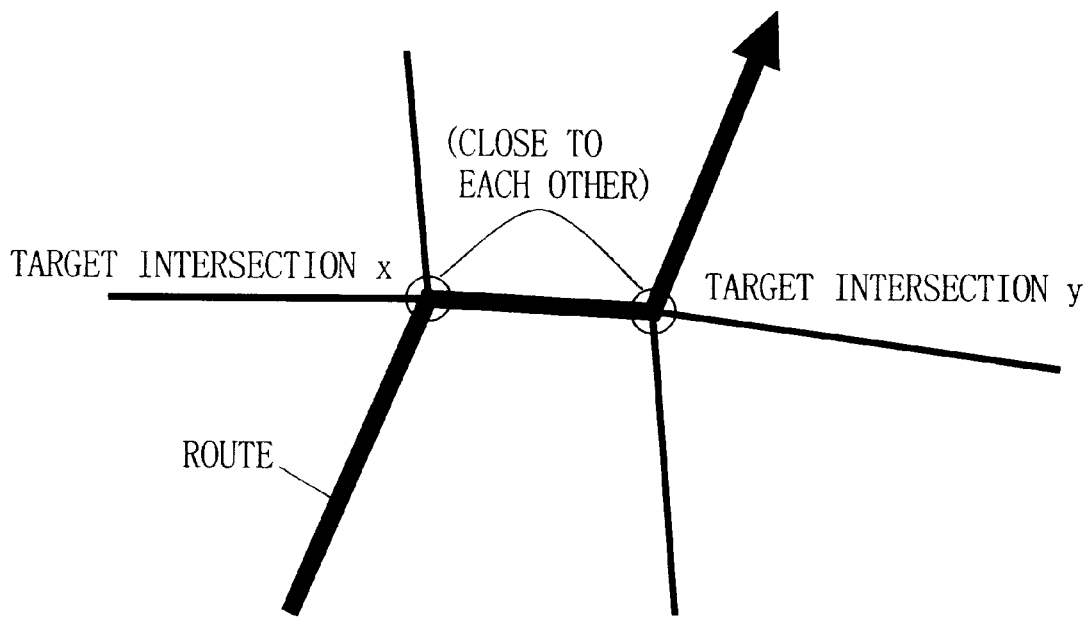
FIG. 7 is an illustration demonstrating a case where two successive target intersections are in close proximity.
Figure 8:
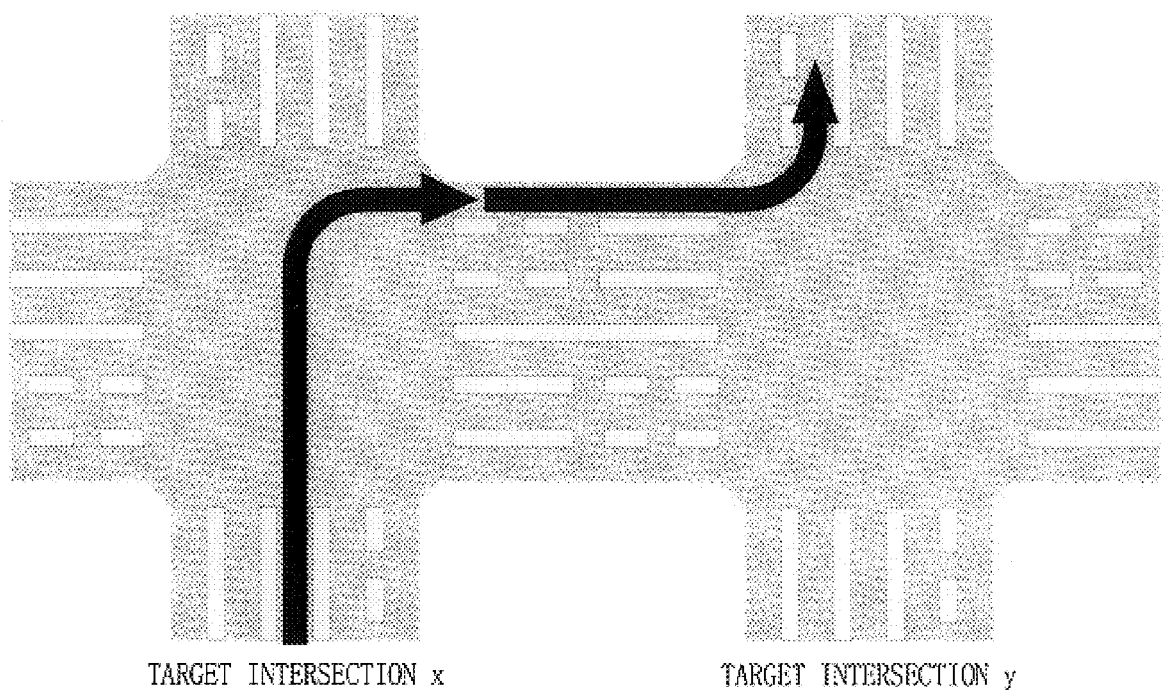
FIG. 8 is an exemplary illustration of an intersection image generated under a fourth technique.
Figure 9:
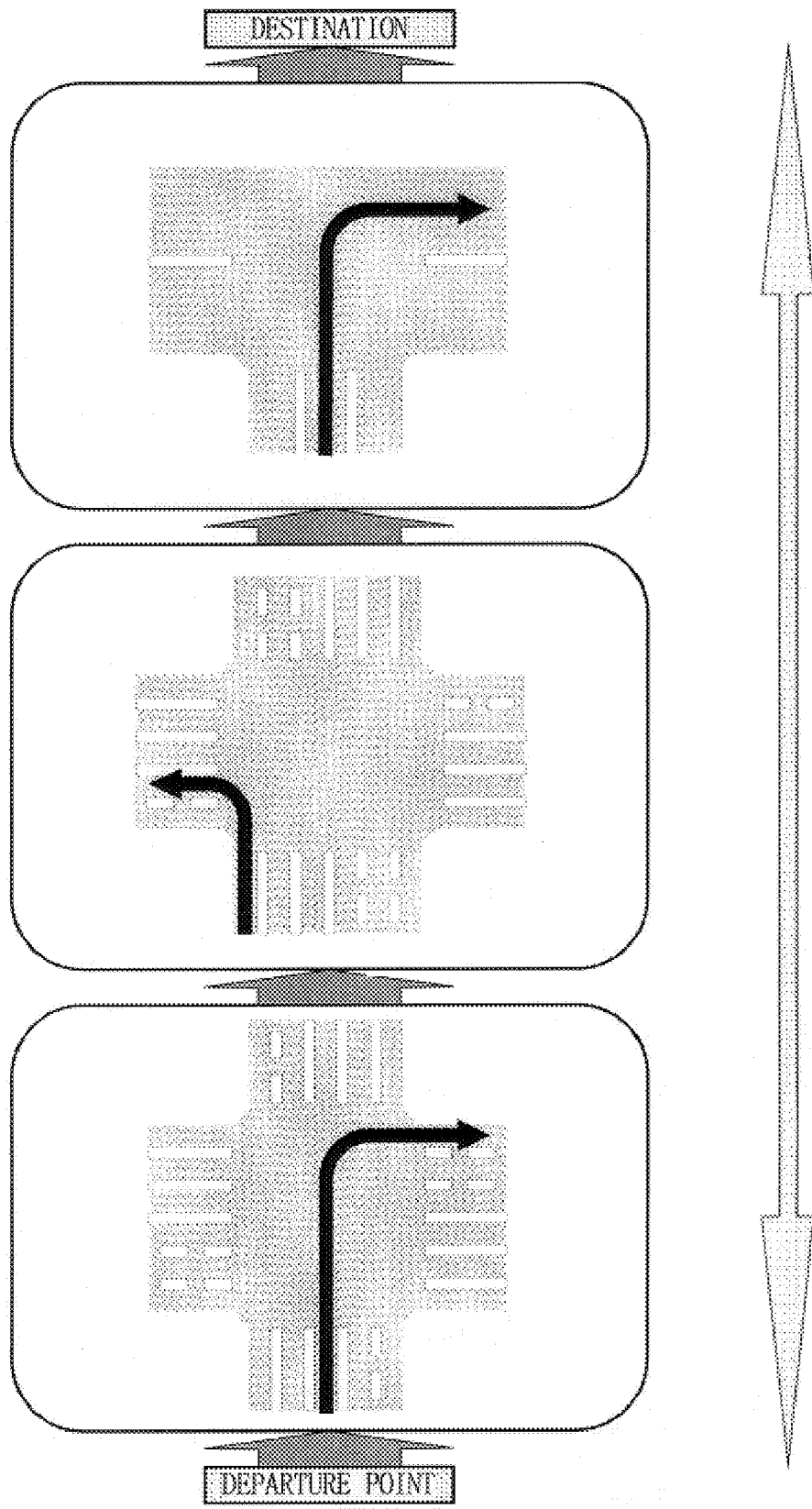
FIG. 9 is an exemplary illustration of an intersection image displayed under a fifth technique.
Figure 10:
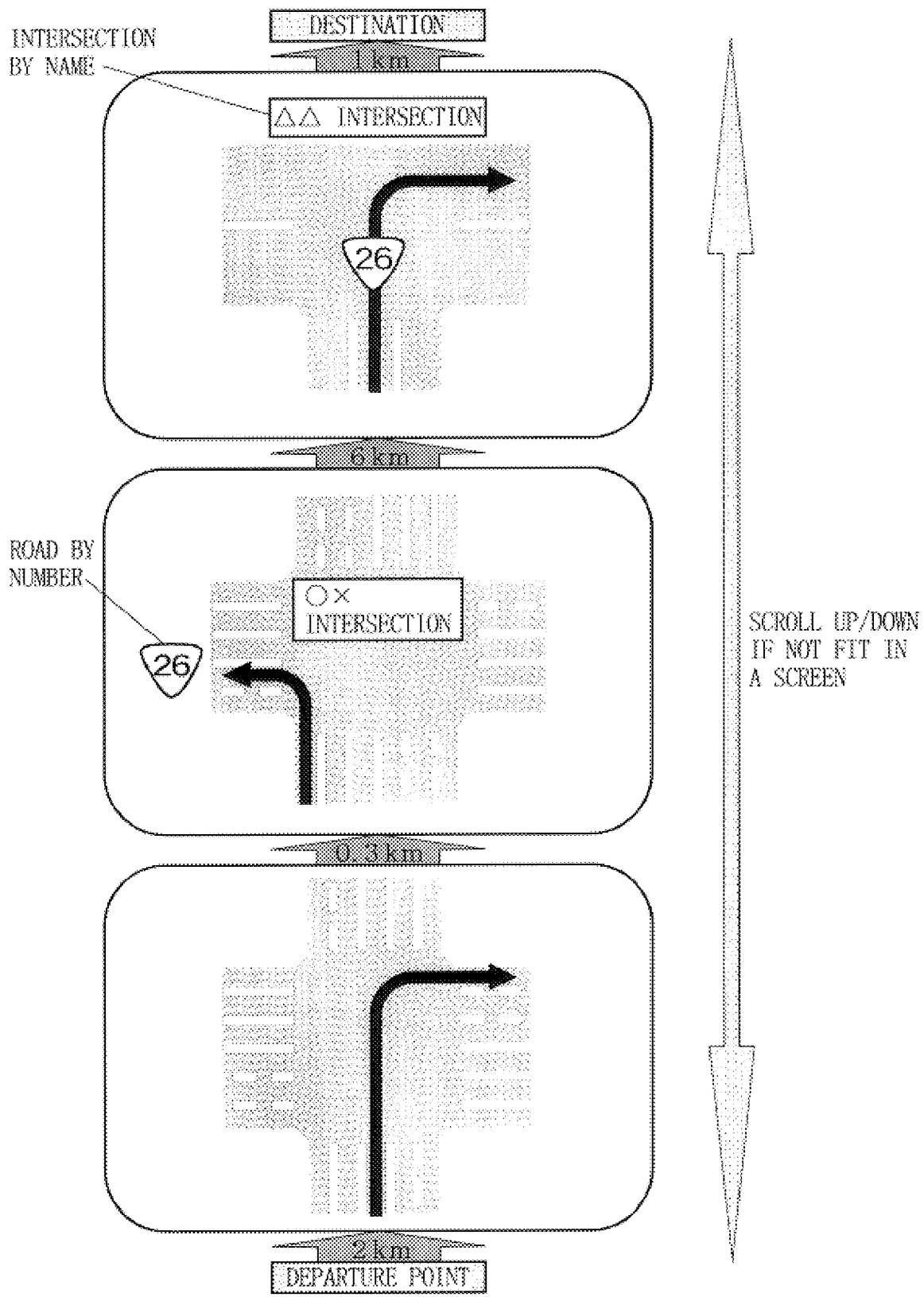
FIG. 10 is another exemplary illustration of an intersection image displayed under the fifth technique.

FIG. 2 is a flowchart showing an example of the operation executed by the target intersection operation part 5, the recommended lane operation part 6, and the guidance part 7 of FIG. 1. FIG. 3 is an exemplary illustration of an intersection image generated by the guidance part 7. FIGS. 4 to 6(*b*) are illustrations of intersection images each generated by combining the intersection image of FIG. 3 with a running path, which is generated under later-described first to third techniques, respectively. FIG. 7 is an illustration demonstrating a case where two successive target intersections are in close proximity. FIG. 8 is an exemplary illustration of an intersection image generated under a fourth technique. FIGS. 9 and 10 are exemplary illustrations of intersection images displayed under a fifth technique.

First, referring to FIG. 2, the target intersection operation part 5 searches and specifies any target intersection for guidance based on the route information received from the route search part 3 and the map data received from the map data storage part 2 (step S11). Then, for each of those specified target intersections, the recommended lane operation part 6 reads data relating the number of lanes of roads to be connected, the lane control, and the like (hereinafter, lane data) from the map data storage part 2, and generates recommended lane information (step S12). This recommended lane information indicates which lanes are recommended for the driver entering into and exiting from the intersection. For example, in a case where a vehicle on a 4-lane road M turns right at an arbitrary target intersection A to enter a 3-lane road N, and then turns left at the next target intersection B, the recommended lane information to be generated for the target intersection A is "to enter (road M): far-right lane, to exit (road N): far-left lane".

Next, based on the target intersection information provided by the target intersection operation part 5 and the lane data read from the map data storage part 2, the guidance part 7 generates an intersection image for each of the target intersections (step S13). Here, the intersection image is simplified optimally for lane guidance, and referred to here is information about the number of lanes on roads connected to the intersection and the bearings at which the roads are connected thereto. FIG. 3 shows an exemplary simplified intersection image generated thereby. For each of the target intersections, the guidance part 7 then generates, based on the recommended lane information received from the recommended lane operation part 6, a running path which passes through the recommended enter and exit lanes. Thus generated running paths are each combined with the corresponding intersection image (step S14). The guidance part 7 then outputs the lane guidance information to the output device 8 with a predetermined timing (for example, 500 m before the target intersection) to display the thus generated intersection image on a display thereof (step S15).

Upon completion of steps S11 to S15, are such simplified images of the target intersections are displayed for lane guidance.

With reference to FIGS. 4 to 10, next to be described is the techniques, in more concrete manner, for generating a running path and combining the path with an intersection image (step S14 described above). In the description below, presumably, the recommended enter lane is a far right lane, and the recommended exit lane a far left lane.

First, with a first technique, a running path represented by one arrow directing from the recommended enter lane to the recommended exit lane is generated (FIG. 4).

The first technique allows the driver to understand at a glance how to go through the intersection by taking which lane. In this sense, the lane guidance offered thereby is driver friendly.

Figure 5A:
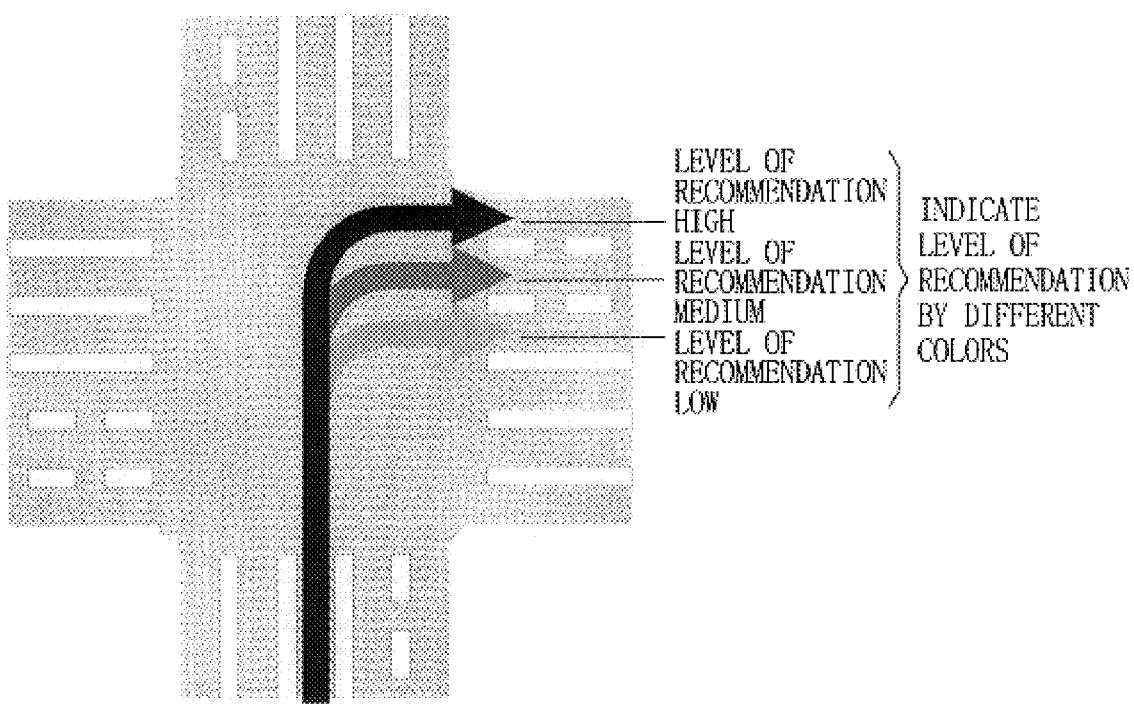
FIGS. 5(*a*) and (*b*) are an exemplary illustrations of an intersection image generated by combining a running path generated under a second technique with the intersection image of FIG. 3.
Figure 5B:
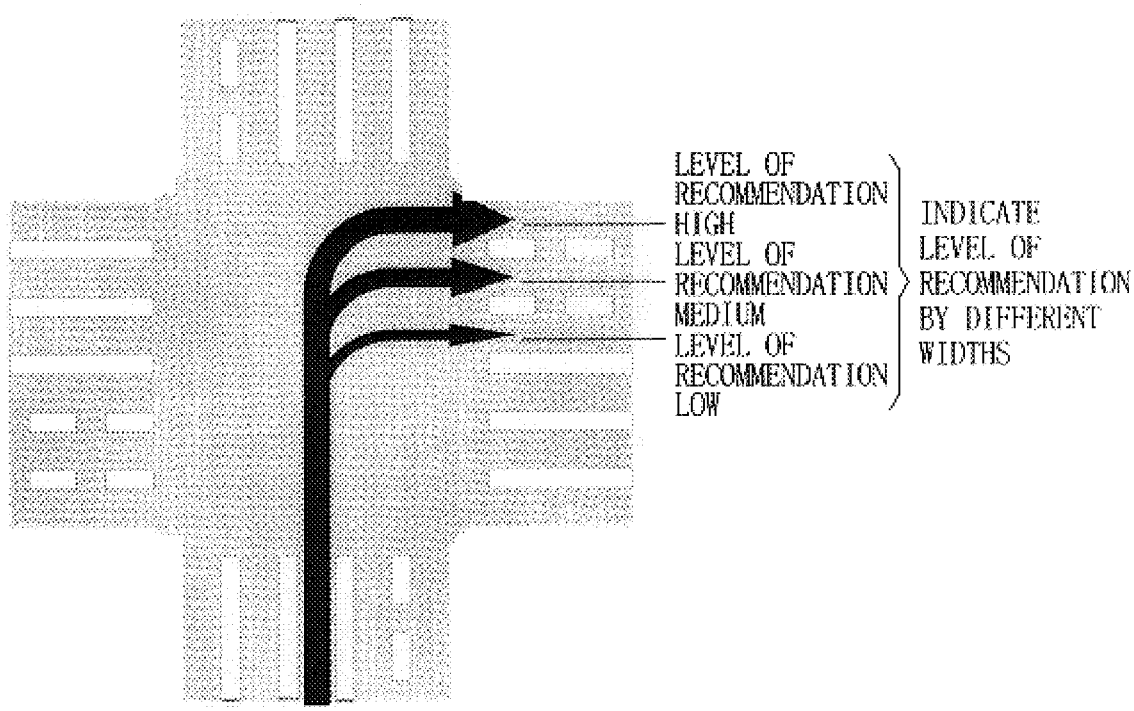

Next, with a second technique, generated are several running paths each represented by an arrow, sharing the same recommended enter lane but each directing to a different exit lane. Here, these arrows are colored differently depending on their level of recommendation, indicating from which lane the driver is more advised to exit the intersection (FIG. 5a). The arrows may also be changed in width depending on their level of recommendation (FIG. 5b). With the second technique, the recommended lane operation part 6 needs to calculate, in step S12, the level of recommendation for each exit lane. The level of recommendation may be represented by discrete or consecutive numbers. Here, the level of recommendation can be freely set depending on conditions such as a distance to the next target intersection, any decrease in road width, or the presence or absence of a bus stop.

The second technique also allows the driver to understand at a glance how to go through the intersection by taking which lane, and furthermore, leaves the lane selection to the driver discretion by showing him/her the level of recommendation for each exit lane. In this sense, the lane guidance offered thereby is more driver friendly.

Figure 6A:
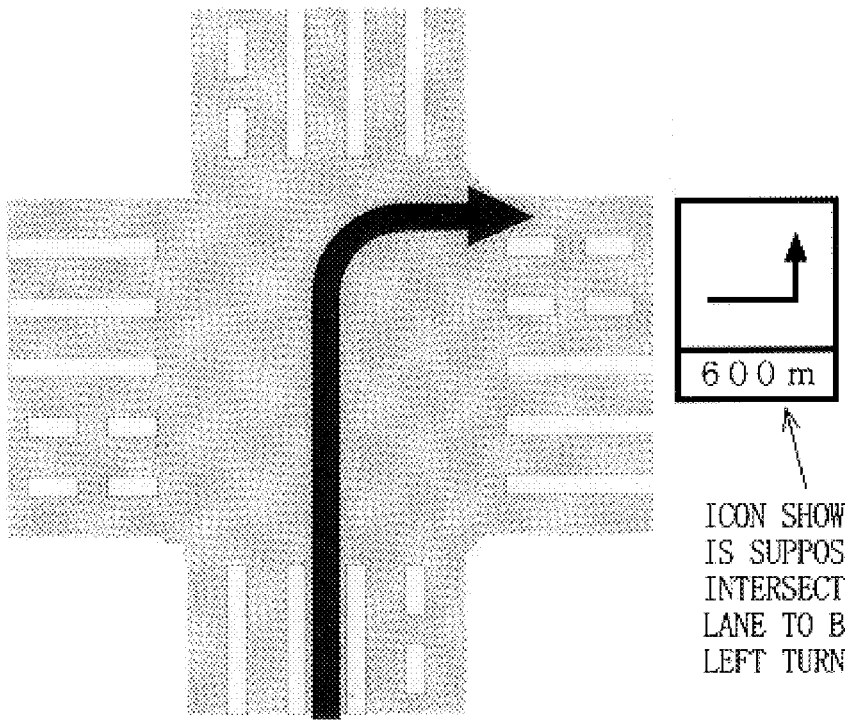
FIGS. 6(*a*) and (*b*) are an exemplary illustrations of an intersection image generated by combining a running path generated under a third technique with the intersection image of FIG. 3.
Figure 6B:
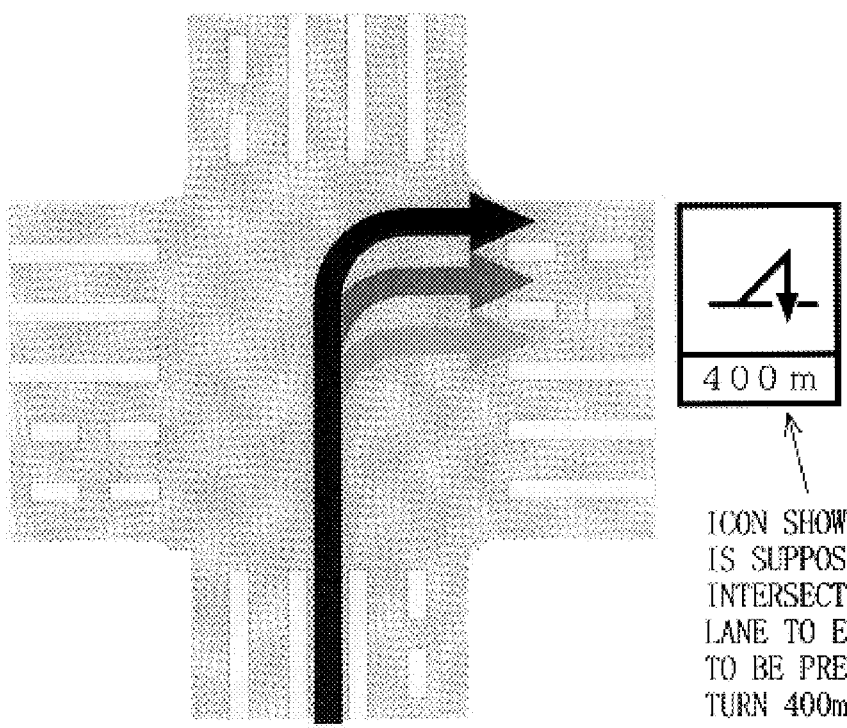

Under a third technique, displayed are grounds for lane recommendation in addition to the running path generated based on the above first and second techniques (FIGS. 6a and 6b). With the third technique, the recommended lane operation part 6 needs to calculate and find, in step S12, the grounds for the lane recommendation for each target intersection based on the searched route and the lane data. In FIGS. 6a and 6b, icons are used to show the driver the distance and the heading direction to the next intersection, thereby explicitly indicating to the driver the grounds for the lane recommendation.

With the third technique, together with the effects achieved under the first and second techniques, the driver can additionally see the grounds for the lane recommendation, and therefore can rest assured.

Next, a fourth technique is applied to a case where two or more successive target intersections are in close proximity (see FIG. 7). Displayed in such case is one intersection image which is the combination of these target intersection images (see FIG. 8). In FIGS. 7 and 8, two target intersections x and y are exemplarily in close proximity.

With the fourth technique, the target intersection operation part 5 determines whether two or more target intersections among those specified in step S11 are located in a row in close proximity. If determined yes, a flag is set in the target intersection information. The guidance part 7 then refers to the flag, and the image generated in step S13 thereby becomes a simplified intersection image which is the combination of those target intersections (combined intersection image). Lastly, the guidance part 7 represents a running path between the recommended enter lane and the recommended exit lane by one or more arrows. In FIG. 8, the running path is exemplarily represented by two arrows.

The fourth technique is effective for a case where guidance has to be continuously displayed at short intervals, for example, where the vehicle successively makes left and right turns in a short distance by displaying one combined intersection image. Therefore, the driver can figure out at a glance what is coming and how to go through the intersections ahead, in advance.

Described next is a fifth technique, which displays all of the target intersections on the searched route in order (see FIG. 9). With the fifth technique, every intersection image generated by the guidance part 7 for each target intersection is outputted to the output part 8 in order from the departure point.

In this manner, the driver can grasp the entire route in advance with the information about the recommended lanes for intersections ahead. Here, the information is presented with no consideration for the distance between the intersections and direction. If all of the intersection images do not fit in a screen, the screen may be scrolled up manually by the user or automatically. As shown in FIG. 10, the information may be additionally displayed with the distance between the intersections, the intersections by name, roads by number, and the like. Under the fifth technique, a lane image representing only the lane control information in a simplified manner may be presented together with the intersection image.

As described in the foregoing, with the lane guidance display method of the present invention, a running path between recommended lanes for entering into and exiting from a target intersection is represented by one or more arrows, achieving visual guidance on a map which covers the running path.

Accordingly, the lane guidance offered thereby is driver friendly as the driver can understand at a glance how to go through a target intersection by taking which lane.

With the first to fifth techniques, a running path is presumably represented by one or more arrows directing from the recommended enter lane to the recommended exit lane, that is, by a solid line (FIGS. 4 to 6b, and 8 to 10). This is not restrictive, and may be a broken or dotted line as long as it serves as a running path, may be an arrow structured by small-sized arrows, or may be represented by successively arranged objects such as circle (dot) and triangle.

While the invention has been described in detail, the foregoing description is in all aspects illustrative and not restrictive. It is understood that numerous other modifications and variations can be devised without departing from the scope of the invention.

What is claimed is:

1. A lane guidance display method for guiding, on a screen, a vehicle on which lane to take to go through an intersection, said lane guidance display method comprising:

searching for a guidance route from a departure point to a destination or a stopover based on map data including lane data, the lane data including a number of lanes and lane control of roads to be connected to the intersection;

specifying a target intersection for guidance located on the guidance route;

determining, based on the guidance route and the lane data, a recommended enter lane for entering the target intersection and a recommended exit lane for exiting the target intersection; and guiding the vehicle by displaying the recommended enter and exit lanes on the screen.

2. The lane guidance display method according to claim 1, wherein said guiding step comprises:

generating an intersection image of the target intersection for lane guidance;

generating a running path for the target intersection which passes through both the recommended enter lane and the recommended exit lane; and displaying, on the screen, a lane guidance intersection image which is a combination of the intersection image and the running path.

3. The lane guidance display method according to claim 2, wherein, when the target intersection is a plurality of target intersections in proximity, the intersection image generated in said intersection image generating step is a combination of the plurality of target intersections in proximity, and the running path generated in said running path generating step passes through the target intersections in proximity.

4. The lane guidance display method according to claim 2, wherein,
  specified as the target intersection in said specifying step are all intersections found on the guidance route as a plurality of target intersections; and
  displayed plurally and collectively in said displaying step is the lane guidance intersection image in an order of the plurality of target intersections on the guidance route.

5. The lane guidance display method according to claim 2, wherein the running path generated in said running path generating step is represented by one or more successive arrows directing from the recommended enter lane to the recommended exit lane.

6. The lane guidance display method according to claim 2, wherein,
  in said determining step, additionally calculated for each exit lane is a lane level of recommendation, which are represented by discrete or successive numbers, and
  the running path generated in said running path generating step is represented, in various manners depending on the lane level of recommendation, by one or more successive arrows directed from the recommended enter lane to the recommended exit lane.

7. The lane guidance display method according to claim 5, wherein,
  in said determining step, grounds for the recommended enter and exit lanes are additionally found, and
  in said displaying step, an image based on the grounds is displayed together with the lane guidance intersection image.

8. The lane guidance display method according to claim 6, wherein,
  in said determining step, grounds for the recommended enter and exit lanes are additionally found, and
  in said displaying step, an image based on the grounds is displayed together with the lane guidance intersection image.

9. A navigation device for guiding a vehicle from a departure point to a destination or a stopover on a screen, said navigation device comprising:
  a map data storage part for storing map data including lane data, the lane data including a number of lanes and lane control of roads to be connected to an intersection;
  a route search part for searching for, based on the map data, a guidance route from the departure point to the destination or the stopover;
  a vehicle position detection part for detecting a vehicle position on the map data;
  a target intersection operation part for searching for and specifying, based on the guidance route and the map data, a target intersection for guidance on the guidance route;
  a recommended lane operation part for determining, based on the guidance route, the lane data, and the target intersection, a recommended enter lane and a recommended exit lane for the target intersection;
  a guidance part for generating, based on the recommended enter and exit lanes and the lane data, lane guidance data required for display on the screen; and
  an output part for displaying guidance for the vehicle on the screen according to the lane guidance data.

10. The navigation device according to claim 9, wherein, said guidance part
  generates an intersection image for lane guidance for the target intersection,
  generates a running path which passes through the recommended enter lane and the recommended exit lane for the target intersection, and
  generates a lane guidance intersection image which is a combination of the intersection image and the running path.

11. The navigation device according to claim 10, wherein, when the target intersection is plurality of target intersection in proximity, the intersection image generated by said guidance part is a combination of the target intersections in proximity, and the running path generated thereby passes through the target intersections in proximity.

12. The navigation device according to claim 10, wherein
  said target intersection operation part specifies all intersections found on the guidance route as said target intersection as a plurality of target intersections, and
  said guidance part outputs the lane guidance data to said output part to plurally and collectively display the lane guidance intersection image in an order of the plurality of target intersections on the guidance route.

13. The navigation device according to claim 10, wherein the running path generated by said guidance part is represented by one or more successive arrows directing from the recommended enter lane to the recommended exit lane.

14. The navigation device according to claim 10, wherein
  said recommended lane operation part additionally calculates a lane level of recommendation for each exit lane represented by discrete or successive numbers, and
  the running path generated by said guidance part is represented, in various manners depending on the lane level of recommendation, by one or more successive arrows directed from the recommended enter lane to the recommended exit lane.

15. The navigation device according to claim 13, wherein
  said recommended lane operation part additionally finds grounds for the recommended enter and exit lanes, and
  said guidance part outputs the lane guidance data to said output part to display an image based on the grounds together with the lane guidance intersection image.

16. The navigation device according to claim 14, wherein
  said recommended lane operation part additionally finds grounds for the recommended enter and exit lanes, and
  said guidance part outputs the lane guidance data to said output part to display an image based on the grounds together with the lane guidance intersection image.

17. A computer program embodied on a computer readable medium for use with a computer for guiding, on a screen, a vehicle on which lane to take to go through an intersection, said computer program comprising:
  computer readable program code operable to search for a guidance route from a departure point to a destination or a stopover based on map data including lane data, the lane data including a number of lanes and lane control of roads to be connected to the intersection;
  computer readable program code operable to specify a target intersection for guidance located on the guidance route;
  computer readable program code operable to determine, based on the guidance route and the lane data, a recommended enter lane for entering the target intersection and a recommended exit lane for exiting the target intersection;

computer readable program code operable to generate an intersection image of the target intersection for lane guidance;

computer readable program code operable to generate a running path for the target intersection which passes through both the recommended enter lane and the recommended exit lane; and computer readable program code operable to display, on the screen, a lane guidance intersection image which is a combination of the intersection image and the running path.

18. The computer program according to claim 17, wherein the running path generated in said computer readable program code operable to generate the running path is represented by one or more successive arrows directing from the recommended enter lane to the recommended exit lane.

19. The computer program according to claim 17, wherein, said computer readable program code operable to determine additionally calculates for each exit lane a lane level of recommendation, which are represented by discrete or successive numbers, and the running path generated in said computer readable program code operable to generate the running path is represented, in various manners depending on the lane level of recommendation, by one or more successive arrows directed from the recommended enter lane to the recommended exit lane.

20. The computer program according to claim 18, wherein, said computer readable program code operable to determine additionally finds grounds for the recommended enter and exit lanes, and said computer readable program code operable to display displays an image based on the grounds together with the lane guidance intersection image.

21. The computer program according to claim 19, wherein, said computer readable program code operable to determine additionally finds grounds for the recommended enter and exit lanes, and said computer readable program code operable to display displays an image based on the grounds together with the lane guidance intersection image.

* * * * *

UNITED STATES PATENT AND TRADEMARK OFFICE
CERTIFICATE OF CORRECTION

PATENT NO. : 6,388,582 B2
DATED : May 14, 2002
INVENTOR(S) : Atsushi Yamashita et al.

It is certified that error appears in the above-identified patent and that said Letters Patent is hereby corrected as shown below:

<u>Title page,</u>
Item [73], please correct the Assignee to read as follows:
-- Matsushita Electric Industrial Co., Ltd., Osaka (JP) --

Signed and Sealed this

Tenth Day of September, 2002

Attest:

Attesting Officer

JAMES E. ROGAN
*Director of the United States Patent and Trademark Office*